United States Patent
Sweet, III et al.

(10) Patent No.: US 9,077,890 B2
(45) Date of Patent: Jul. 7, 2015

(54) AUTO-FOCUS TRACKING

(75) Inventors: Charles Wheeler Sweet, III, San Diego, CA (US); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 710 days.

(21) Appl. No.: 13/034,577

(22) Filed: Feb. 24, 2011

(65) Prior Publication Data

US 2012/0218456 A1     Aug. 30, 2012

(51) Int. Cl.
H04N 5/232     (2006.01)

(52) U.S. Cl.
CPC ....... *H04N 5/23212* (2013.01); *H04N 5/23219* (2013.01); *H04N 5/23293* (2013.01)

(58) Field of Classification Search
CPC .................................................. H04N 5/23212
USPC .......................................... 348/345, 349, 352
See application file for complete search history.

(56) References Cited

U.S. PATENT DOCUMENTS

| | | |
|---|---|---|
| 2007/0263904 A1 | 11/2007 | Muramatsu |
| 2009/0059023 A1 | 3/2009 | Sasaki |
| 2009/0268080 A1 | 10/2009 | Song et al. |
| 2009/0278943 A1 | 11/2009 | Silverbrook |
| 2009/0322934 A1 | 12/2009 | Ishii |
| 2010/0002128 A1 | 1/2010 | Ishii |
| 2010/0002909 A1 | 1/2010 | Lefevre et al. |
| 2010/0066856 A1 | 3/2010 | Kishimoto et al. |
| 2010/0189427 A1 | 7/2010 | Ilya et al. |
| 2011/0115945 A1* | 5/2011 | Takano et al. ............ 348/231.99 |
| 2011/0234885 A1* | 9/2011 | Muramatsu .................. 348/345 |

FOREIGN PATENT DOCUMENTS

| | | |
|---|---|---|
| EP | 1855464 A2 | 11/2007 |
| EP | 1909229 A2 | 4/2008 |
| EP | 2104338 A2 | 9/2009 |
| EP | 2207342 A2 | 7/2010 |
| JP | 2007306416 A | 11/2007 |

(Continued)

OTHER PUBLICATIONS

Gammeter et al., "Server-side Object Recognition and Client-side Object Tracking for Mobile Augmented Reality," 2010 IEEE Computer Society Conference on Computer Vision and Pattern Recognition Workshops, pp. 1-8.

(Continued)

*Primary Examiner* — James Hannett
(74) *Attorney, Agent, or Firm* — Jennifer M. Pascua

(57) ABSTRACT

An apparatus and method for supporting augmented reality or other computer vision applications are presented. Embodiments enable communication between natural feature and auto-focus engines to increase an engine's accuracy or decrease a processing time of the engine. An auto-focus engine may communicate a location of an auto-focus window to a natural feature detection module and/or a change in location of a previous auto-focus window to a next auto-focus window. The natural feature detection module uses the communicated information to limit an initial search area and/or to set a next tracking search window. A natural feature tracking module may communicate a changes from a previous location of a natural feature to a next location of the natural feature to an auto-focus engine. The auto-focus engine uses the change to set a next auto-focus window.

28 Claims, 11 Drawing Sheets

(56) References Cited

FOREIGN PATENT DOCUMENTS

| | | | |
|---|---|---|---|
| JP | 2008263478 | A | 10/2008 |
| JP | 2008270896 | A | 11/2008 |
| JP | 2009177503 | A | 8/2009 |
| JP | 2009229568 | A | 10/2009 |
| JP | 2010113130 | A | 5/2010 |

OTHER PUBLICATIONS

International Search Report and Written Opinion—PCT/US2012/026655—ISA/EPO—Jul. 19, 2012.

* cited by examiner

AUTO-FOCUS TRACKING

CROSS-REFERENCE TO RELATED APPLICATIONS

Not Applicable.

BACKGROUND

I. Field of the Invention

This disclosure relates generally to apparatus and methods for augmented reality and other computer vision application, and more particularly to integration of camera auto-focus with computer vision-based recognition and tracking.

II. Background

Augmented reality systems use natural features as reference points within a sequence of images to place computer generated icons and images. A natural feature processing engine, including a natural feature detection module and a natural feature tracking module, is used to find and follow these reference points. Mobile devices may be enhanced with such augmented reality engines. Many mobile devices also have cameras with auto-focus capabilities provided by an auto-focus engine. Both natural feature and auto-focus engines track changes from image to image, however, known systems fail to allow communication between these engines.

In augmented reality, tracking that accurately follows the tracked object's movement and position creates a significantly improved user experience. Consequently, much effort is put into improving tracking performance. Object tracking functionally in a processor operates separately from auto-focus functionality at the front end of a camera. Auto-focus functionality is typically performed in hardware or with hardware acceleration. Auto-focus operations may result in information useful for improving natural feature detection and/or tracking. Similarly, natural feature detection and tracking may result in information useful for improving auto-focus functionality.

Many existing mobile devices 10 contain a camera and a processor. The camera provides images to the processor, which may modify the image by various augmented reality techniques. The processor may send a control signal trigger to camera activation and the camera provides the image or sequence of images to the processor for image processing in response. No information obtained from natural feature processing is returned to the camera to assist in obtaining an improved image. That is, control information beyond triggering does not flow from the processor to the camera.

In other existing mobile devices 10, image processing associated with natural feature detection and tracking is dissociated with image processing associated with auto-focusing. FIG. 1 shows a known system containing a natural feature processing engine 110 and an auto-focus engine 300, which are uncoupled and therefore do not communicate information as shown by delineation 400. An existing mobile device 10 contains one or more processors that function as a natural feature processing engine 110 and also as an auto-focus engine 300. The natural feature processing engine 110 includes a natural feature detection module 120 and a natural feature tracking module 125.

In general, operations in the natural feature detection module 120 and the natural feature tracking module 125 function in parallel, however, for a particular natural feature, these operations appear to occur in sequence where a natural feature is first detected within an image then tracked through subsequent images. The location of the natural feature within the image is used by a separate processing for augmented reality module 130. Each image undergoes processing through the natural feature detection module 120 to detect new natural features and also undergoes processing through the natural feature tracking module 125 to follow the movement of already detected natural features from image to image.

As shown at delineation 400, the auto-focus engine 300 has no communication with the natural feature processing engine 110 and may run as a parallel task. The auto-focus engine 300 may be implemented in hardware or may be implemented in a combination of hardware and software. The auto-focus engine 300 operates in real-time or near real-time to capture new images. Thus, a continued need exists to improve both natural feature processing as well as auto focusing.

BRIEF SUMMARY

Disclosed is an apparatus and method for coupling a natural feature processing engine with an auto-focus engine.

According to some aspects, disclosed is a mobile device for use in computer vision, the mobile device comprising: a natural feature processing engine comprising a natural feature detection module and a natural feature tracking module; and an auto-focus engine coupled to the natural feature processing engine to communicate information; wherein the information is used to set a location of a window comprising at least one of a next natural feature window or a next auto-focus window.

According to some aspects, disclosed is a method in a mobile device for use in computer vision, the method comprising: auto-focusing in an auto-focus window in an image using an auto-focus engine; detecting and tracking a natural feature in the image with a natural feature processing engine; and communicating information between the auto-focus engine and the natural feature processing engine, wherein the information is used to set a location of a window comprising at least one of a next natural feature window or a next auto-focus window.

According to some aspects, disclosed is a mobile device for use in computer vision, the mobile device comprising: a camera and an auto-focus engine; and a processor and memory comprising program code for: auto-focusing in an auto-focus window in an image using the auto-focus engine; detecting and tracking a natural feature in the image with an natural feature processing engine; and communicating information between the auto-focus engine and the natural feature processing engine, wherein the information is used to set a location of a window comprising at least one of a next natural feature window or a next auto-focus window.

According to some aspects, disclosed is a mobile device for use in computer vision, the mobile device comprising: means for auto-focusing in an auto-focus window in an image using an auto-focus engine; means for detecting and tracking a natural feature in the image with a natural feature processing engine; and means for communicating information between the auto-focus engine and the natural feature processing engine, wherein the information is used to set a location of a window comprising at least one of a next natural feature window or a next auto-focus window.

According to some aspects, disclosed is a mobile device for use in computer vision, the mobile device comprising: a camera and an auto-focus engine; and a processor and memory comprising program code for performing the methods described above.

According to some aspects, disclosed is a mobile device for use in computer vision, the mobile device comprising means for performing the methods described above.

According to some aspects, disclosed is a nonvolatile computer-readable storage medium including program code stored thereon, comprising program code for performing the methods described above.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

Figure 1:
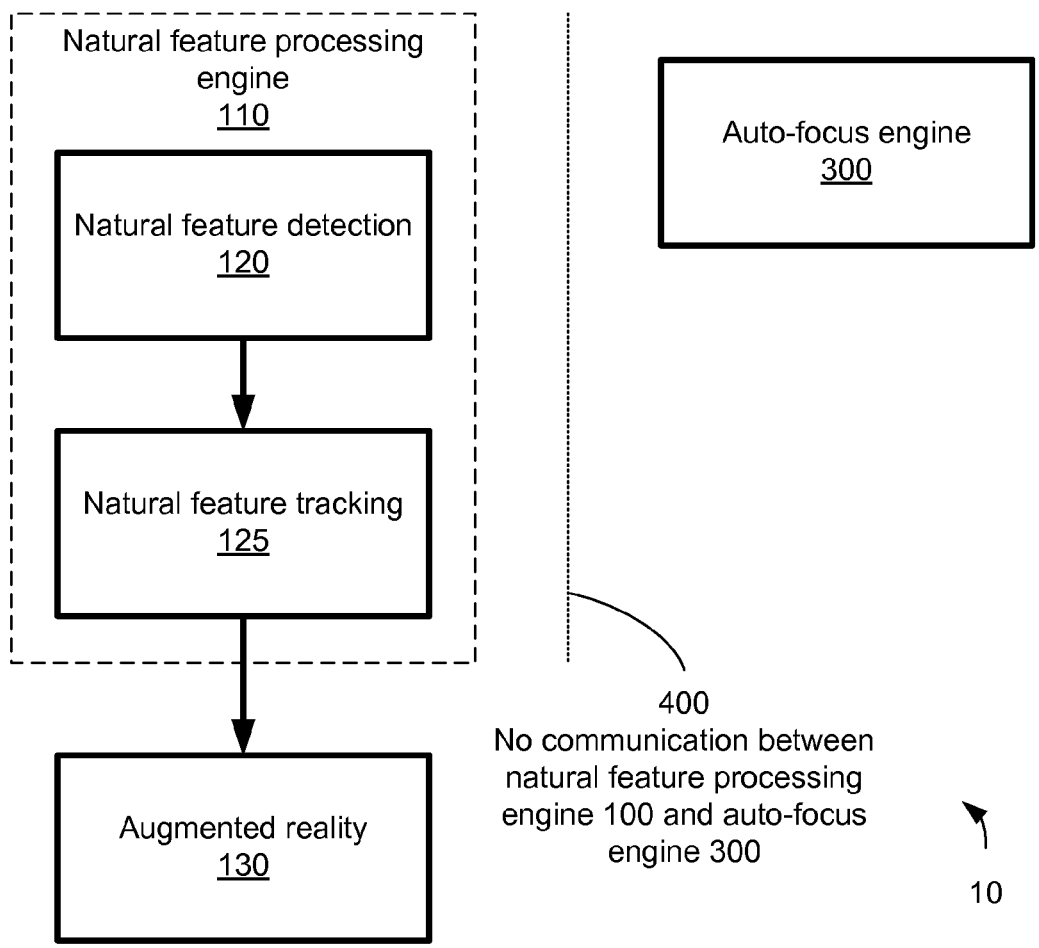
FIG. 1 shows a known system containing a natural feature processing engine and an auto-focus engine, which do not communicate information.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device 100, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, mobile device 100 is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

Unlike existing mobile devices 10, a mobile device 100 in accordance with the present invention allows communication between an auto-focus engine 300 and the natural feature processing engine 110, as described below. Similar to existing mobile devices 10, the mobile device 100 contains memory, one or more processors, which function as a natural feature processing engine 110 and an auto-focus engine 300, and a user interface, such as a display, speaker, touch screen and/or buttons. The natural feature processing engine 110, also referred to as computer vision-based recognition and tracking, includes a natural feature detection module 120 and a natural feature tracking module 125.

Figure 2:
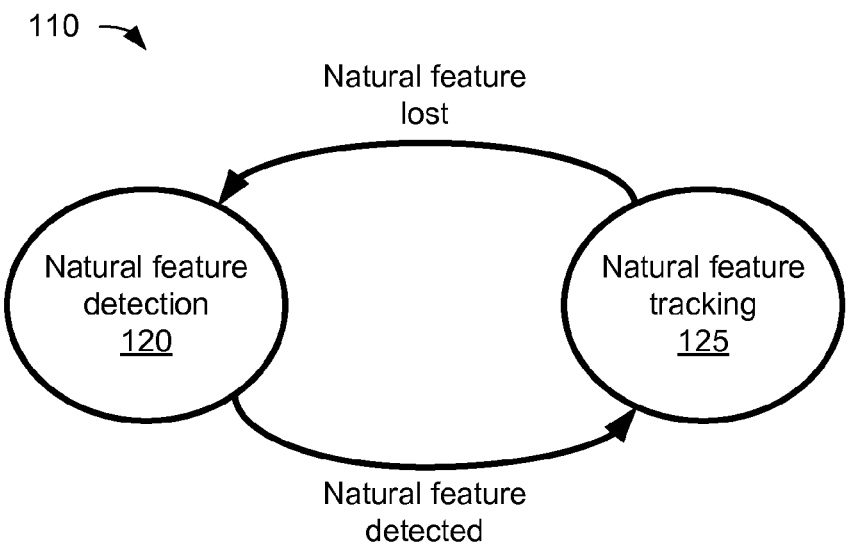
FIG. 2 shows known states within a natural feature processing engine for detecting and tracking natural features.

FIG. 2 shows known states within a natural feature processing engine 110 for detecting and tracking natural features. Within each image, the processor searches for new or undetected natural features with the natural feature detection module 120. Once a natural feature is detect, the processor follows the detected natural feature with the natural feature tracking module 125. Once the natural feature can no longer be followed (e.g., the natural feature is no longer in the image or is no longer distinguishable), the natural feature may be declared lost.

Figure 3:
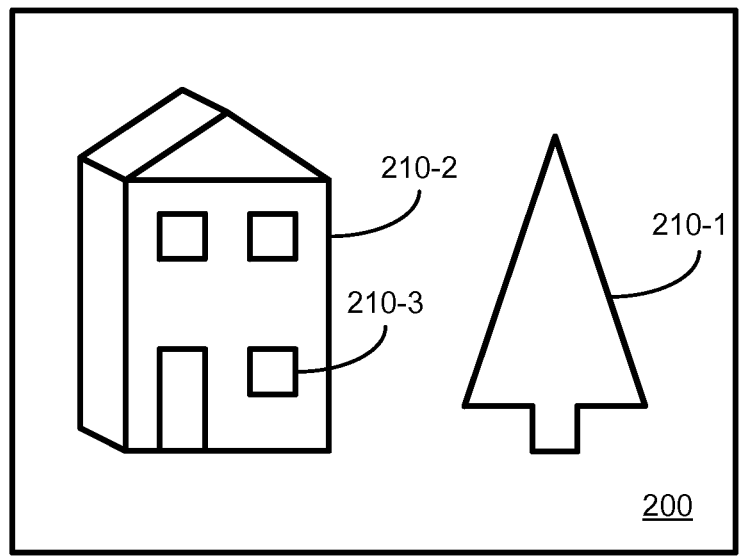
FIG. 3 illustrates an image containing a building and a tree with features to be tracked.
Figure 4:
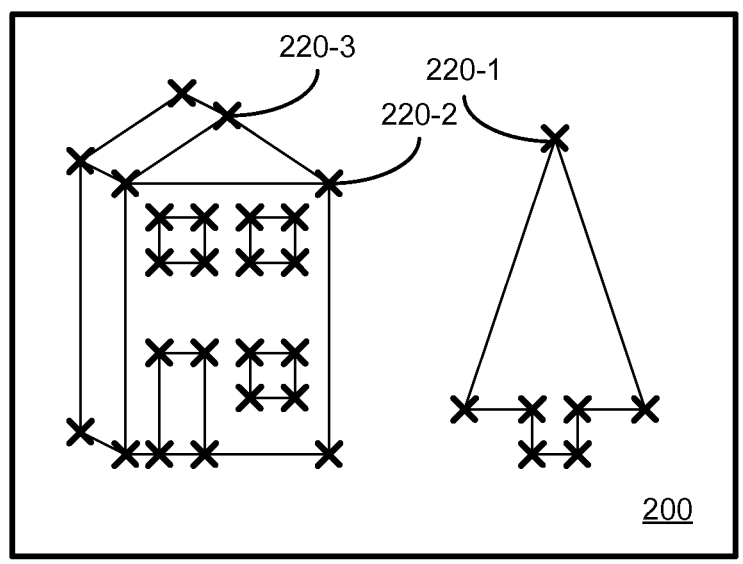
FIG. 4 illustrates natural features overlying the image.

FIG. 3 illustrates an image 200 containing objects 210 defining various natural features 220 able to be tracked. Using the natural feature detection module 120, the image 200 may undergo various processing, including, for example, corner, line and/or edge detection. The objects 210 shown include a tree 210-1 next to a building with a side 210-2 and a building window 210-3. Here, the image 200 undergoes corner detection to form the illustration of FIG. 4, in which natural features 220 are on top of the image 200. In this case, various corners are detected as natural features 220-1, 220-2 and 220-3 in the image 200.

Figure 5:
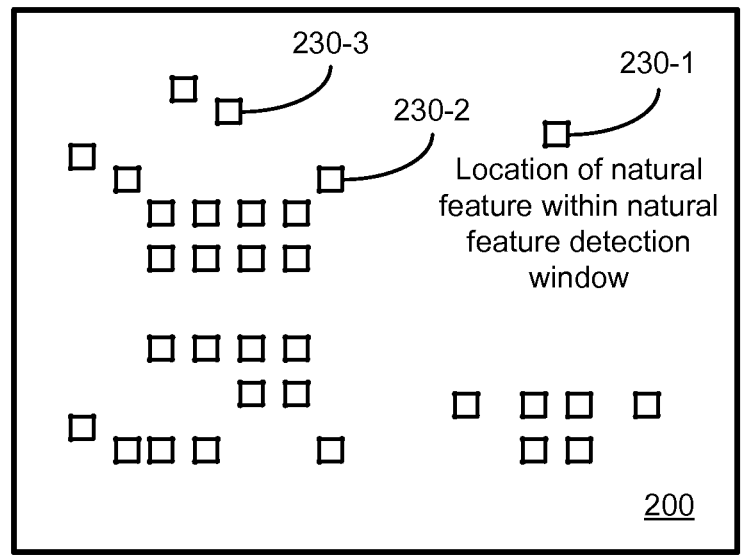
FIG. 5 illustrates locations of various natural features.

FIG. 5 illustrates various locations of natural features 220. The locations of the natural features 220 are shown by natural feature windows 230 around each natural feature 220. The processor may use the natural feature windows 230 in an attempt to detect or track a location of the natural features 220 within a next image 200'. The processor may execute a matching the algorithm to find the natural feature 220. For example, the processor may use correlation (e.g., normalized cross correlation) to match the natural feature 220 to its new location. The processor may correlate pixels within a grid around each natural feature 220 in a first image 200 to pixels in the general grid location in a second image'. For example, the natural feature tracking module 125 identifies an 8-by-8 grid of pixels at a particular location on a first image 200. The area defined by the pixel dimension and location is referred below as a natural feature window 230 or a predicted natural feature window 240. The term natural feature window 230 is used to define a window before or after a location of a natural feature 220 is known and the term predicted natural feature window 240 is used to define a window before a precise location of a natural feature 220 is known. In general, both the natural feature window 230 and the predicted natural feature window 240 are substantially smaller than an auto-focus window (referred to below as an auto-focus window 310), where the natural feature window 230 and predicted natural feature window 240 typically encompass fewer than 200 pixels and the auto-focus window 310 encompasses more than 200 pixels.

Processing speed directly correlates to the coverage area or size of the predicted natural feature window 240; smaller predicted natural feature window 240 covering only a small area or only a few pixels are able to be processed more quickly than larger windows. Thus, a goal is to keep predicted natural feature windows 240 smaller when feasible. Various pixel dimensions are possible for the predicted natural feature window 240. For example, rather than using an 8×8 square grid to track a natural feature 220, a processor may use a predicted natural feature window 240 having other square or non-square fixed-dimension grid sizes (e.g., 4×4, 10×10 or 16×16 pixels) or variable-dimensions grid sizes (e.g., where the size depend on characteristics of the natural feature). A processor tracking a natural feature 220 in a next predicted natural feature window 240' may examine the same location of the natural feature window 230 from a first image 200 (e.g., defined by the 8-by-8 pixel grid) in a second image 200'. If the correlation results in a high result or above a predefined threshold, no movement or slight movement may have occurred between images and as expected the pixel location of the natural feature 220 is expected to be in the same pixel location on the second image 200'. If the camera is moving linearly and/or rotating, or if objects in the image 200 are moving relative to the mobile device 100, then the natural features 220 will have appeared to move from the first image 200 to the second image 200' as illustrated in the following figure. In this case, a high correlation result will occur at the new location in the second image 200' if the next predicted natural feature window 240' still encompasses the natural feature 220. In general, a next predicted natural feature window 240' may become smaller or larger depending of the environment of the mobile device 100.

Figure 6:
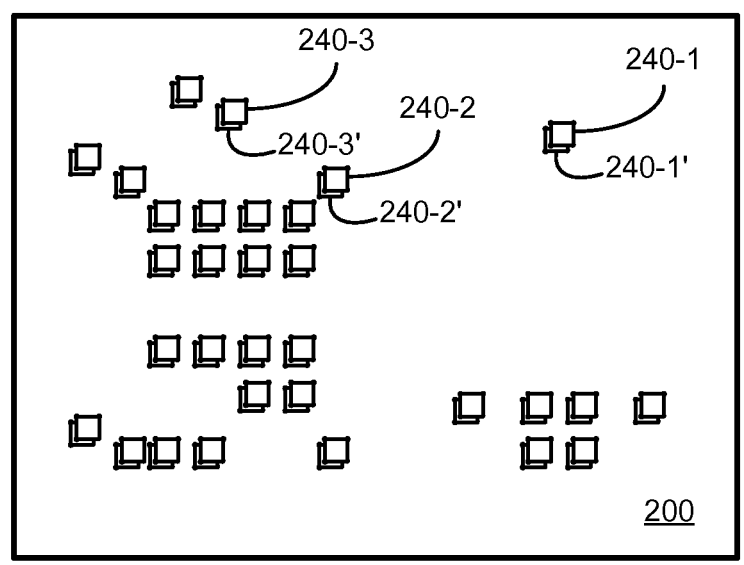
FIG. 6 illustrates changes in locations of various natural features between two images.

FIG. 6 illustrates changes in locations of various natural features 220 between two images. A processor may change the predicted natural feature windows 240 used to track natural features 220 in a first image 200 to new pixel locations in the next predicted natural feature window 240' in a second image 200'. Here, the predicted natural feature windows 240 (240-1, 240-2 and 240-3) and the next predicted natural feature window 240' (240-1', 240-2' and 240-3') overlap and appear to have shifted. The next predicted natural feature window 240' is estimated before the natural feature 220 is detected or tracked within the second image 200'. In example shown, a large number, a majority or all of the natural features may appear to have moved down and to the left. Most likely, the camera has moved up and to the right but the actual objects 210 have not moved. In any case, by moving the next predicted natural feature windows 240' to a new pixel location within a subsequent image, the natural feature tracking module 125 may limit processing used in searching across an otherwise larger correlation area. That is, according to some embodiments, each predicted natural feature window 240 and 240' may be smaller and still obtain a high correlation result within a similar or shorter time period.

Figure 7:
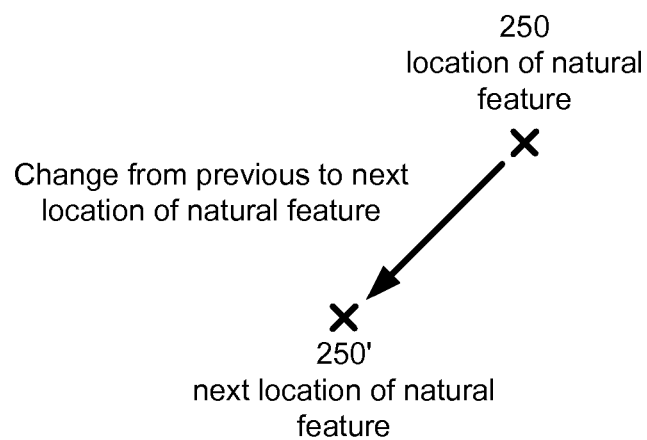
FIG. 7 illustrates a change from a location of a natural feature in a first image to a next location of the same natural feature in a second image.

FIG. 7 illustrates a change from a location 250 of a natural feature 220 in a first image 200 to a next location 250' of the same natural feature 220 in a second image 200'. A location 250 of natural feature 220 from a first image 200 is first detected then tracked by the processor. Tracking comprises predicting a next window size and/or location (next predicted natural feature window 240') then performing a correlation or other matching to find the natural feature 220 within the next predicted natural feature window 240'. In this manner, the location 250 of natural feature 220 is tracked a next location 250' in the second or next image 200'. As explained above, the change appears as movement in pixel location of a natural feature 220 may be caused by the natural feature 220 actually moving and/or the camera moving and/or rotating from image to image.

In addition to a natural feature processing, a mobile device 100 typically performs auto-focus processing using its a camera. Cameras in such mobile devices 100 often contain an auto-focus engine 300, which adjusts and fixes focusing based on a detected object 210. These objects 210 are often human faces or other distinctive scenery and are larger than a natural feature 220 or a natural feature window 230. The auto-focus engine 300 may operate on a continuous analog image or may operate on a digital image to focus on an area of the image defined by an auto-focus window 310. From image to image, the auto-focus window 310 may appear to move across a sequence of images. In this sense, the auto-focus engine 300 tracks an object 210 within the sequence of images.

According to some embodiments of the present invention, a mobile device 100 couples communication between an auto-focus engine 300 in a camera and a natural feature processing engine 110, and performs computer vision-based recognition and tracking. The auto-focus engine 300 and a natural feature processing engine 110 are allowed to communicate information such as a pixel position or change in pixel position of either or both an auto-focus window 310 and/or a natural feature 220. The auto-focus engine 300 may use information from the natural feature processing engine 110 to better position its auto-focus window 310 (i.e., a next pixel location and/or size of a box within the image). Similarly, the natural feature processing engine 110 may use information from the auto-focus engine 300 to better position a predicted natural feature window 240 for finding a pixel position of a natural feature 220. Alternatively, the natural feature processing engine 110 disregards this information from the auto-focus engine 300.

Figure 8:
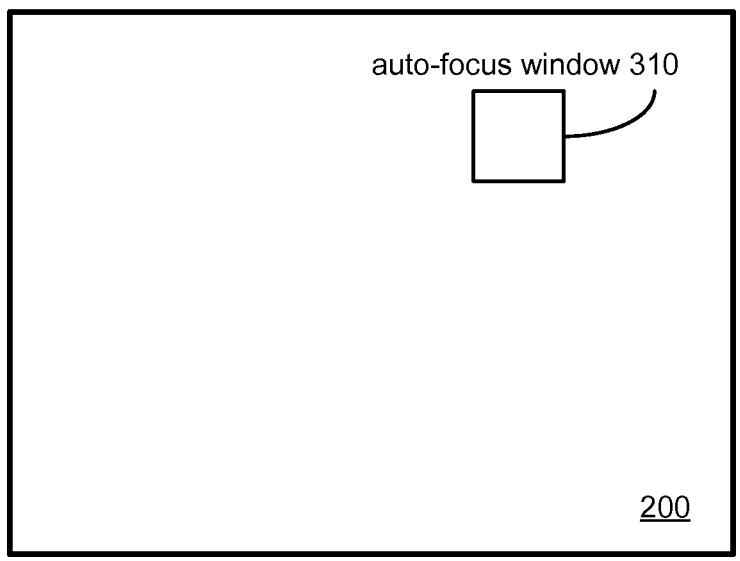
FIG. 8 shows an auto-focus window within an image.

FIG. 8 shows an auto-focus window 310 within an image 200. Typically, an auto-focus engine 300 searches through an entire image 200 to find an object 210 or objects 210 (e.g., one or more faces). The auto-focus engine 300 then displays the auto-focus window 310 around the object 210 and performs focusing for that object 210. The auto-focus engine 300 searches the entire image area again for the objects 210 in the next image 200', and then updates the pixel position of the auto-focus window 310 and refocuses the camera if necessary.

Such found objects 210 may contain one or several natural features 220 that the natural feature tracking module 125 is following. When searching for objects 210, the auto-focus engine 300 may advantageously use pixel locations within an image as determined by the natural feature processing engine 110 to limit the search area from the entire image to an area in proximity to the detected and tracked natural features.

Figure 9:
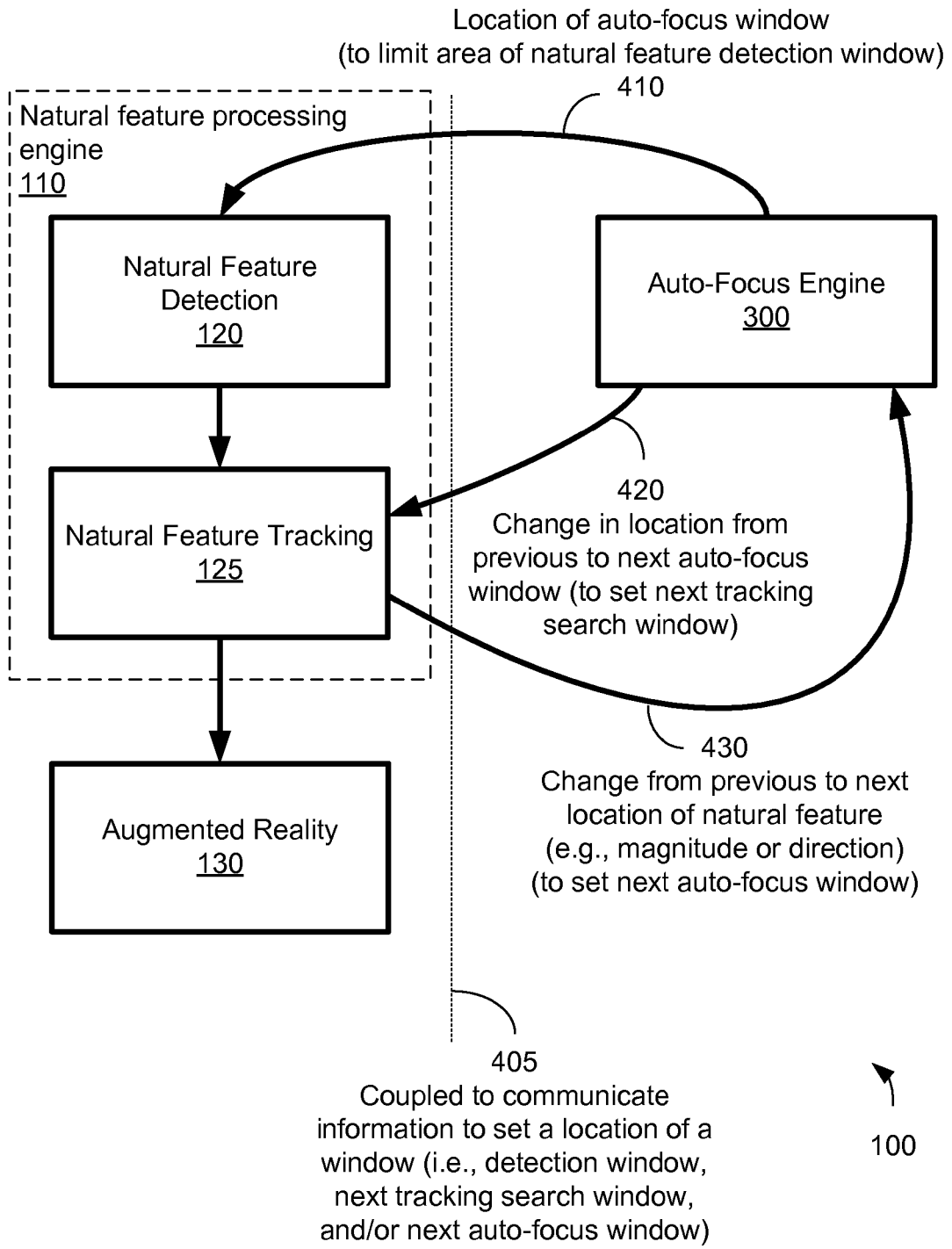
FIG. 9 shows a mobile device containing a natural feature processing engine and an auto-focus engine communicating information, in accordance with some embodiments of the present invention.

FIG. 9 shows a mobile device 100 containing a natural feature processing engine 110 and an auto-focus engine 300 communicating information, in accordance with some embodiments of the present invention. Instead of isolated engines in existing mobile devices 10 as shown in FIG. 1, the engines for the mobile device 100 of FIG. 9 are coupled, which allows the natural feature processing engine 110 and auto-focus engine 300 to communicate information in one direction or in both directions as shown across line 405.

As shown at 410, some embodiments allow the auto-focus engine 300 to send information to the natural feature processing engine 110 that indicates the current size and/or location of an auto-focus window 310 within an image 200, as described below with reference to FIG. 10.

As shown at 420, some embodiments allow the auto-focus engine 300 to send information to the natural feature processing engine 110 that indicates a change in size and/or a change in location from one auto-focus window 310 to a next auto-focus window 310', as described below with reference to FIGS. 11, 12 and 13.

As shown at 430, some embodiments allow the natural feature processing engine 110 to send information to the auto-focus engine 300 that indicates a change from a location 250 of natural feature 220 and/or a natural feature window 230 or a predicted natural feature window 240 to a next location 250' of the natural feature 220 and/or a next natural feature window 230' or a next predicted natural feature window 240', as described below with reference to FIG. 14.

Embodiments include at least one or more of 410, 420 and/or 430 as information communicated between the auto-focus engine 300 and the natural feature processing engine 110. For example, some embodiments communicate only one of 410, 420 and 430: (1) a first embodiment communicates 410 but not 420 or 430; (2) a second embodiment communicates 410 but not 410 or 430; and (3) a third embodiment communicates 430 but not 410 or 420. Additional examples communicate two of 410, 420 and 430: (4) a fourth embodiment communicates both 410 and 420 but not 430; (5) a fifth embodiment communicates both 420 and 430 but not 410; and (6) a sixth embodiment communicates both 410 and 430 but not 430. Finally, further examples communicate all three: (7) a seventh embodiment communicates 410, 420 and 430. Therefore, when an embodiment communicates information between the auto-focus engine and the natural feature processing engine, some embodiments communicate just one of 410, 420 or 430, other embodiments communicate two of 410, 420 and 430, while still other embodiments communicate all three of 410, 420 and 430.

This communicated information is used to set a location of a natural feature window and/or an auto-focus window. For example, some embodiments only communicate information shown at 410 to limit the area of the next predicted natural feature window 240'. Other embodiments only communicate information shown at 420 to change a center location of the next predicted natural feature window 240'. Still other embodiments only communicate information shown at 430 to change a location of a next auto-focus window 310'. As stated above, some embodiments implement two of 410, 420 and 430 as information communicated between the auto-focus engine 300 coupled and the natural feature processing engine 110, while other embodiments implement all three of 410, 420 and 430 as information communicated between the auto-focus engine 300 and the natural feature processing engine 110. In some embodiments, the auto-focus engine 300 acts as a slave and the natural feature processing engine 110 acts as its master.

The natural feature processing engine 110 acts as a means for detecting and tracking a natural feature 220 in the image 200 with a natural feature processing engine 110. The natural feature detection module 120 acts as a means for detecting a natural feature 220. The natural feature tracking module 125 acts as a means for tracking a natural feature 220. A processor or processors may act as a means for performing each of the functions of the natural feature processing engine 110, such as using the auto-focus window 310 to limit an area of detection of natural features 220. That is, natural features 220 are searched for only within an area defined by the auto-focus window 310. A processor or processors may also act as a means of finding a natural feature 220 within the limited area, setting a next predicted natural feature window 240' based on a change, tracking a natural feature 220 within the next predicted natural feature window 240', tracking a natural feature 220 to the first pixel location within a first image 200, and/or tracking the natural feature 220 to the second pixel location within a second image 200'.

The auto-focus engine 300 acts as a means for auto-focusing in an auto-focus window 310 in an image 200. A processor or processors may act as a means for performing each of the functions of the auto-focus engine 300, such as setting a first auto-focus window 310 within a first image 200, setting a second or next auto-focus window 310' within a second image 200', setting a next auto-focus window 310' based on the change, and auto-focusing within the next auto-focus window 310'.

These one or more processors, engines and/or modules, separately or in combination, may act as means for communicating information between the auto-focus engine 300 and the natural feature processing engine 110. The information may include a location of the auto-focus window 310, a change, a change from a first location to a second location, a change in location from a previous or current auto-focus window 310 to a next auto-focus window 310', and/or a change from a previous or current location 250 to a next location 250' of a natural feature 220.

Figure 10:
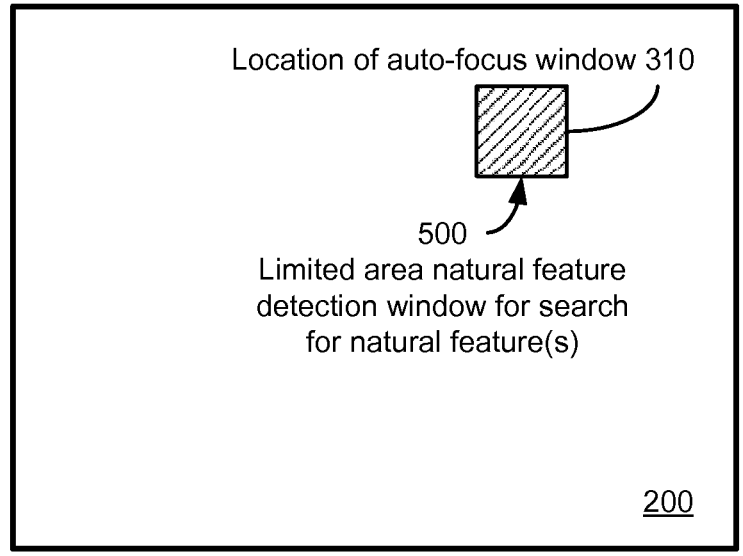
FIG. 10 shows a location of an auto-focus window being used to limit an area for detecting natural features, in accordance with some embodiments of the present invention.

FIG. 10 shows a location of an auto-focus window 310 being used to limit an area 500 for detecting natural features 220, in accordance with some embodiments of the present invention. As mentioned above at 410, the auto-focus engine 300 sends information to the natural feature processing engine 110 regarding the current size and/or location of an auto-focus window 310 within an image 200. In turn, the natural feature processing engine 110 may limit its search area to area 500 for detecting new natural features 220 and/or tracking already-detected natural features 220 by detecting or searching for natural feature 220 only within a predicted natural feature window 240 set based on an area 500 (e.g., defined by a threshold distance inside or outside the boarders of the auto-focus window 310). By limiting detection and/or search to an area 500, processing power otherwise used may be substantially reduced. In some embodiments, this threshold distance may be zero while in other embodiments the threshold distance may allow for a predicted natural feature window 240 to include natural features 220 to be tracked that are just outside of the auto-focus window 310. In other embodiments, the auto-focus engine 300 may send, to the natural feature processing engine 110, parameters identifying multiple auto-focus windows 310 within a single image 200. In these embodiments, detecting and/or tracking may be limited to area 500 defined by these multiple auto-focus windows 310.

Figure 11:
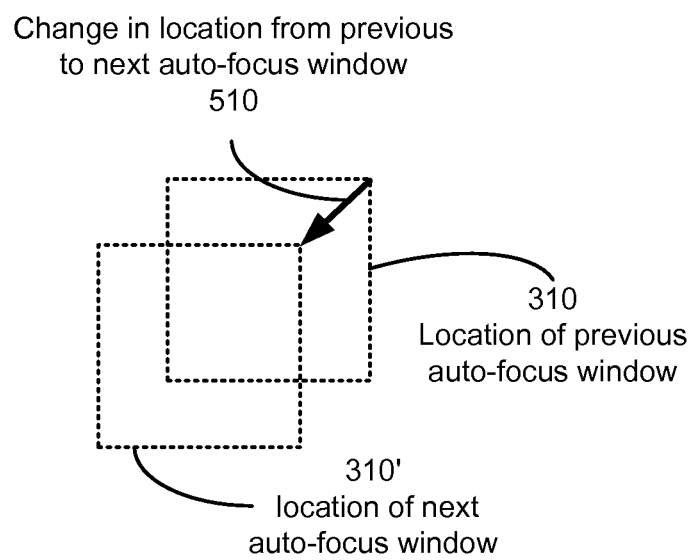
FIG. 11 shows a change in location from a previous auto-focus window to a next auto-focus window.

FIG. 11 shows a change 510 in location from a previous or current auto-focus window 310 to a next auto-focus window 310'. As discussed above with reference to 420, some embodiments allow the auto-focus engine 300 to send information to the natural feature processing engine 110 regarding a change in size and/or a change 510 in location from previous or current auto-focus window 310 to next auto-focus window 310'.

Figure 12:
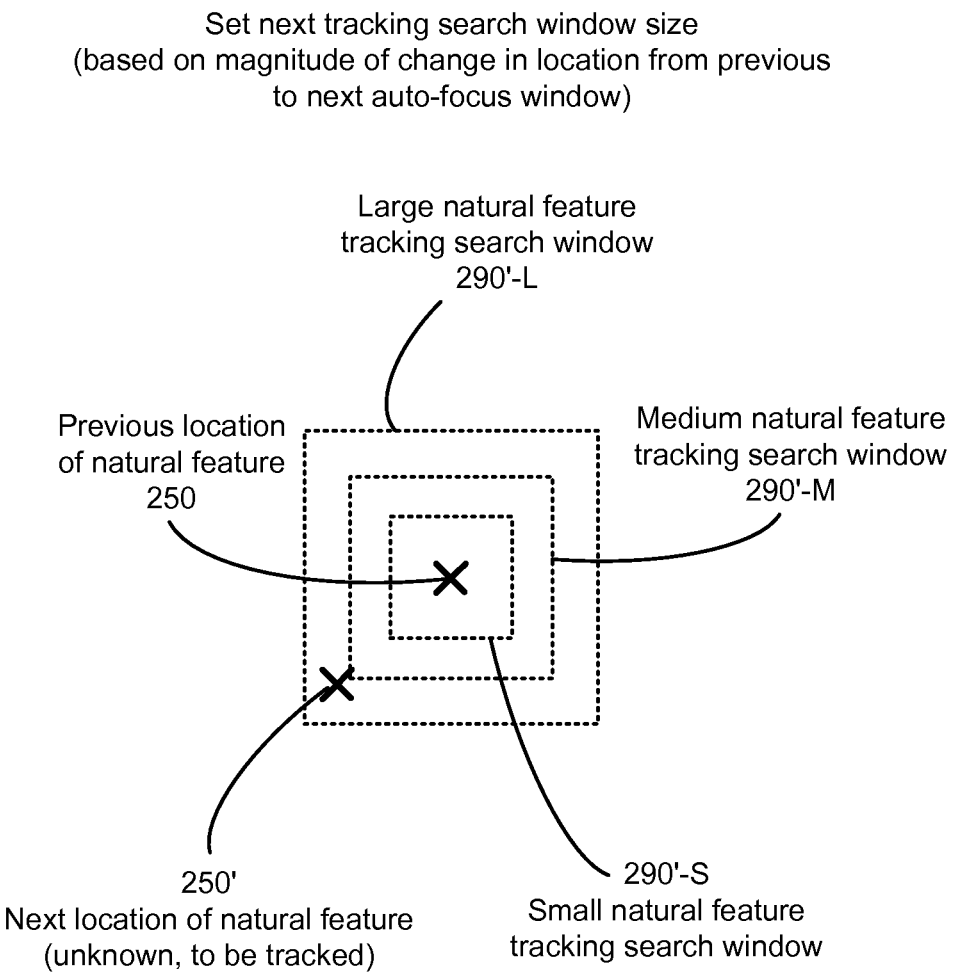
FIG. 12 shows setting a size of a next tracking search window based on magnitude of change in location from previous auto-focus window to next auto-focus window, in accordance with some embodiments of the present invention.

FIG. 12 shows setting a size of a next predicted natural feature window 240' based on a magnitude of change in location from previous or current auto-focus window 310 to next auto-focus window 310', in accordance with some embodiments of the present invention. The natural feature processing engine 110, and in particular the natural feature tracking module 125, may use this indicated change in location of the auto-focus window 310 to determine how to change the size from one predicted natural feature window 240 to a next predicted natural feature window 240'. A small magnitude of change in position from the one auto-focus window 310 to the next auto-focus window 310' could be used by the natural feature processing engine 110 to limit the size of the next predicted natural feature window 240' to a smaller-sized window 290'-S. A medium or mid-range change could be used to limit the size to a mid-sized window 290'-M. A large change could be used to limit the size of the next auto-focus window 310' to a larger-sized window 290'-L. A previous location 250 of a natural feature 220 is shown at the center of each of the windows 290'-S/M/L. As in the example shown, if the magnitude of the change in location from the previous auto-focus window 310 to the next auto-focus window 310' is large, then the next location of the natural feature 220, which is currently unknown and still to be tracked, would probably be inside the larger-sized window 290'-L.

Figure 13:
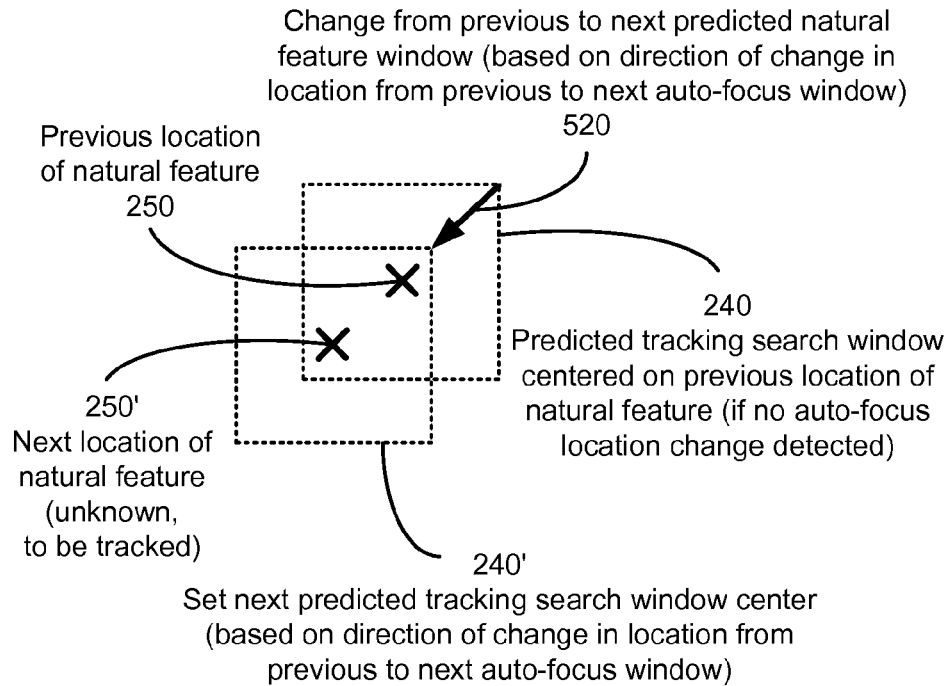
FIG. 13 shows setting a center of a next tracking search window based on a direction of change in location from previous auto-focus window to next auto-focus window, in accordance with some embodiments of the present invention.

FIG. 13 shows the setting of a center of a next predicted natural feature window 240' based on a direction of change 520 in location from previous auto-focus window 310 to next auto-focus window 310', in accordance with some embodiments of the present invention. This change indication, shown as change 520, may assist the natural feature tracking module 125 in setting a next predicted natural feature window 240'. For example, if there was no change 520 between successive auto-focus windows or the change 520 was below a threshold, the next predicted natural feature window 240' is center of the previous predicted natural feature window 240. In this case, the next predicted natural feature window 240' is co-located with the previous natural feature window 230, the previous predicted natural feature window 240 or the location 250 of the detected natural feature 220.

However, if a change 520 between successive auto-focus windows exists and is provided to the natural feature processing engine 110, the natural feature tracking module 125 may set a next predicted natural feature window 240' based on the direction and magnitude of the next auto-focus window 310' as compared to the previous auto-focus window 310. Presumably, the next location 250 of the natural feature 220, which at this point the location is unknown and still to be tracked, would fall inside of the next predicted natural feature window 240'.

Figure 14:
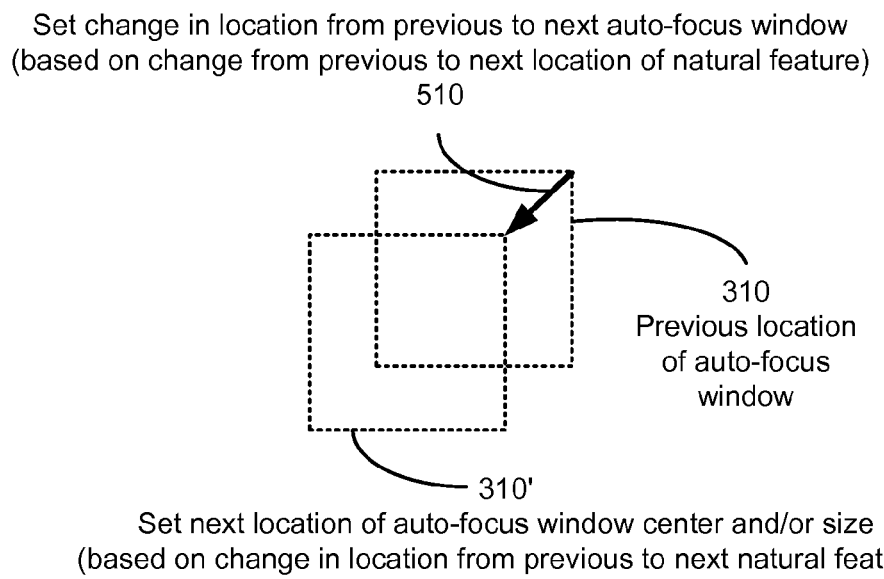
FIG. 14 shows setting a change in location (center and/or size) of a previous auto-focus window to a next auto-focus window based on change from previous location of a natural feature to a next location of the natural feature, in accordance with some embodiments of the present invention.

FIG. 14 shows setting a change 510 in location (center and/or size) of a previous auto-focus window 310 to a next auto-focus window 310' based on change from previous location 250 of a natural feature 220 to a next location 250' of the natural feature 220, in accordance with some embodiments of the present invention. As mentioned above, the natural feature processing engine 110 sends information to the auto-focus engine 300 regarding a change from a previous location 250 of a natural feature 220 to a next location 250' of natural feature 220, or from a natural feature window 230 to a next natural feature window 230'. This information may include a magnitude of change and/or a direction of change of the natural feature 220 or between natural feature windows. The auto-focus engine 300 may use the magnitude of change to broaden or narrow the size of the next auto-focus window 310'. For example, a large magnitude of change may indicate a larger area of uncertainty; thus, the auto-focus engine 300 may increase the area of the next auto-focus window 310'. Similarly, a small to zero magnitude may be used by the auto-focus engine 300 to keep the size of the next auto-focus window 310' constant or slightly reduce the size from the previous auto-focus window 310. Alternatively, the auto-focus engine 300 may use a direction of change to change the size or move the location the next auto-focus window 310'. For example, a direction of change may change the center point of the next auto-focus window 310'. Alternately, the direction of change may change the size of the next auto-focus window 310'. For example, a 10-pixel movement of the location of the natural feature 220 or the next predicted natural feature window 240' may expand the next auto-focus window 310' by 10 pixels in each linear direction (i.e., up, down, left, right). If both direction and magnitude are available, the auto-focus engine 300 change the center and size of the next auto-focus window 310' based on the combined change in direction and magnitude of the location of natural feature 220.

Figure 15:
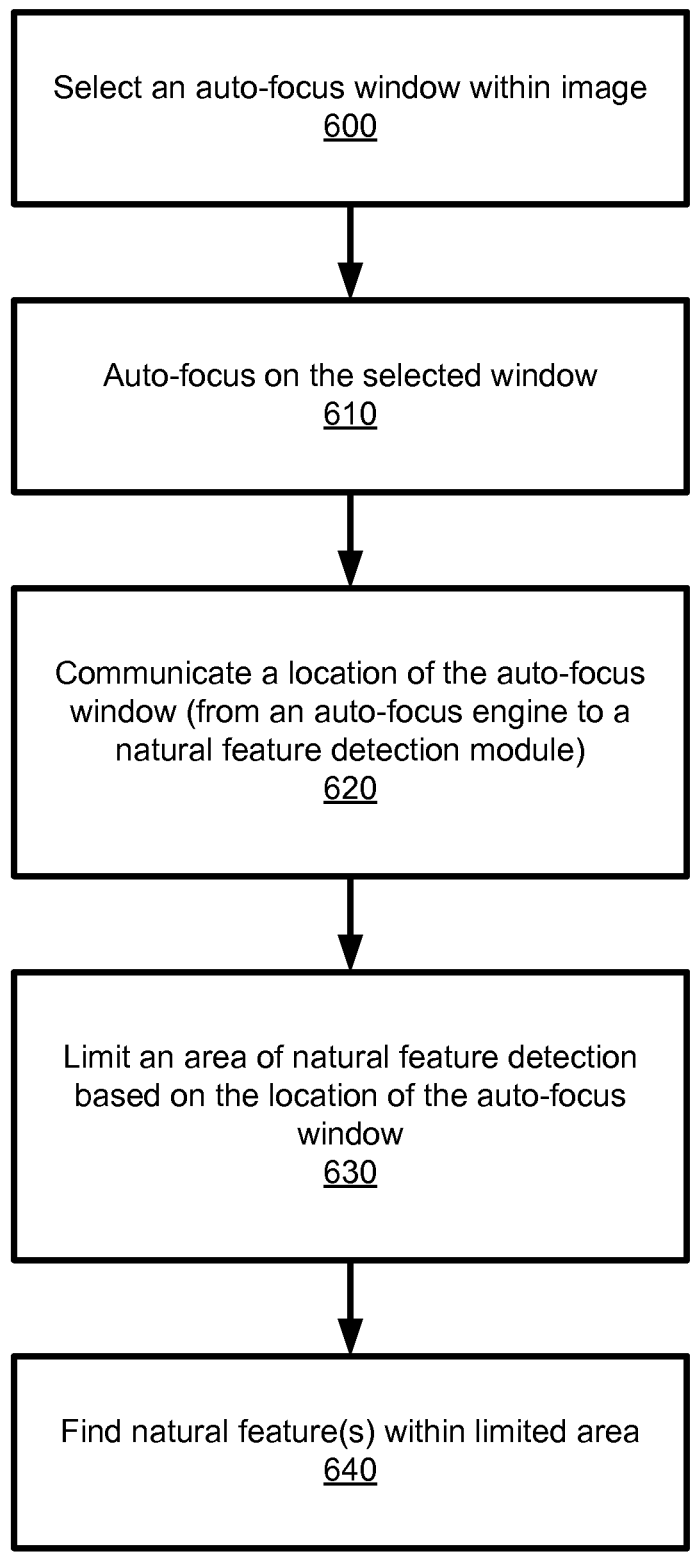
FIG. 15 shows a method for limiting an area of for natural feature detection based on a location of an auto-focus window, in accordance with some embodiments of the present invention.

FIG. 15 shows a method for limiting an area of for natural feature detection based on a location of an auto-focus window 310, in accordance with some embodiments of the present invention. At step 600, the auto-focus engine 300 in the mobile device 100 selects an auto-focus window 310 within an image 200. At step 610, the camera of the mobile device 100 performs auto-focusing in selecting an auto-focus window 310. At step 620, the auto-focus engine 300 communicates a location of the auto-focus window 310 to the natural feature processing engine 110, the natural feature detection module 120, and/or the natural feature tracking module 125. Next, for example, at step 630, the natural feature tracking module 125 limits an area 500 for natural feature detection based on the location of the auto-focus window 310. That is, area 500 defines a predicted natural feature window 240. In some cases, a threshold is used to expand or restrict the area 500 to an area greater or lesser than the auto-focus window 310. At step 640, the natural feature detection module 120, and/or the natural feature tracking module 125 detects and/or tracks natural feature(s) within limited area 500.

Figure 16:
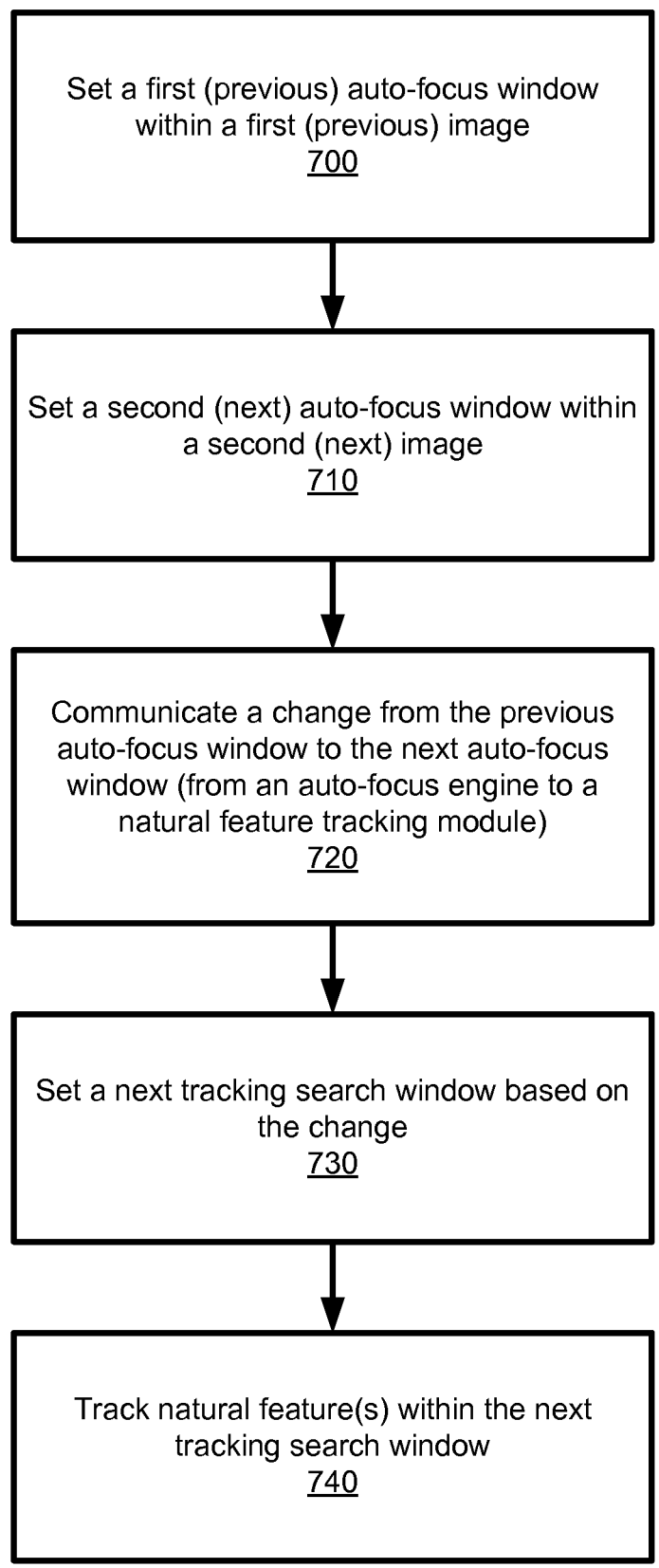
FIG. 16 shows a method for setting a next natural feature window based on a change between a previous auto-focus window and a next auto-focus window, in accordance with some embodiments of the present invention.

FIG. 16 shows a method for setting a next natural feature window 230' based on a change between a previous auto-focus window 310 and a next auto-focus window 310', in accordance with some embodiments of the present invention. At step 700, the auto-focus engine 300 in the mobile device 100 sets a first auto-focus window 310 within a first image 200. After selecting the first auto-focus window 310, at step 710, the auto-focus engine 300 sets a second auto-focus window 310' within a second image 200'. At step 720, the auto-focus engine 300 communicates a change 510 from the previous auto-focus window 310 to the next auto-focus window 310' to the natural feature processing engine 110, the natural feature detection module 120, and/or the natural feature tracking module 125. At step 730, the natural feature tracking module 125 sets a next predicted natural feature window 240' based on the change 510. At step 740, the natural feature tracking module 125 tracks one or more natural features within the next predicted natural feature window 240'.

Figure 17:
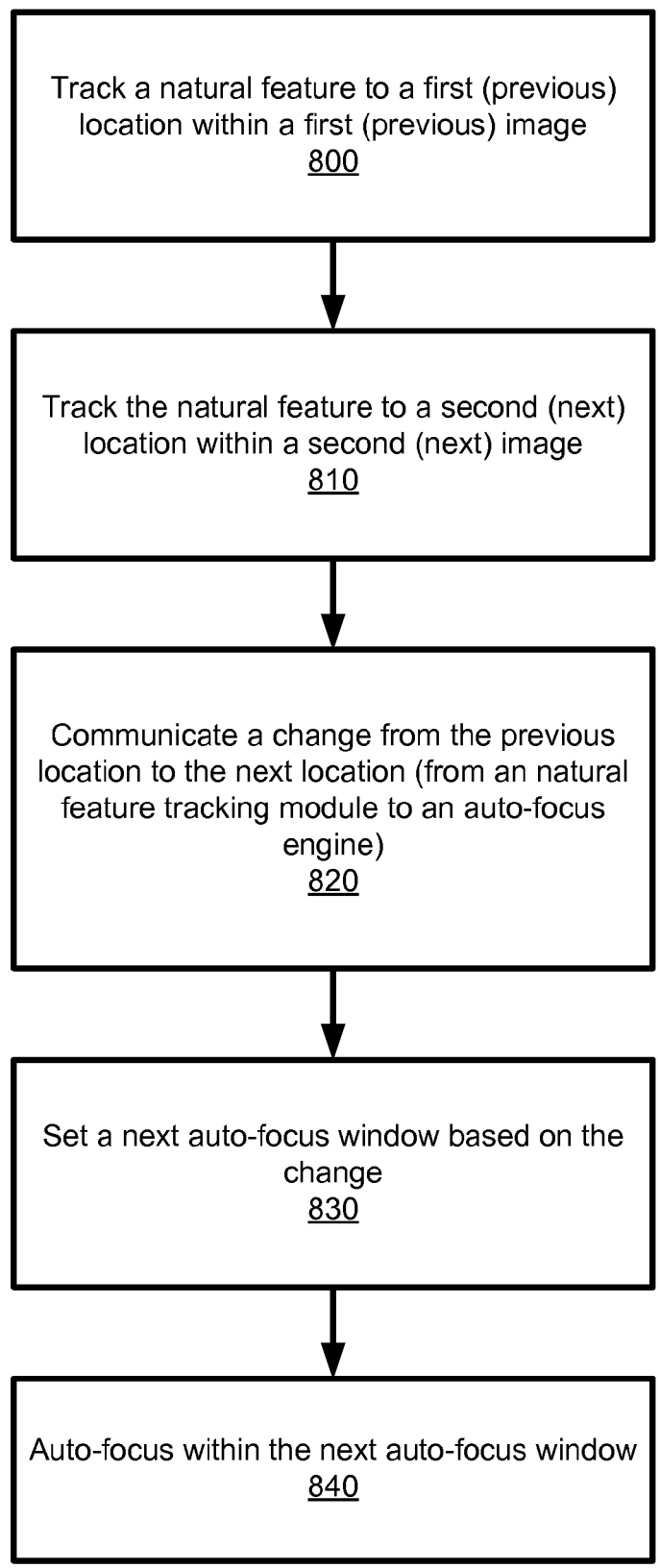
FIG. 17 shows a method for setting a next auto-focus window based on a change from a previous location to a next location of a natural feature, in accordance with some embodiments of the present invention.

FIG. 17 shows a method for setting a next auto-focus window 310' based on a change from a previous location 250 to a next location 250' of a natural feature 220, in accordance with some embodiments of the present invention. At step 800, the natural feature tracking module 125 tracks natural features 220 starting at a first location 250 within a first image 200. At step 810, the natural feature tracking module 125 tracks the natural features 220 to a second location 250' within a second image 200'. At step 820, the natural feature tracking module 125 communicates a change 520 from the first location 250 to the second location 250' to the auto-focus engine 300. At step 830, the auto-focus engine 300 sets a next auto-focus window 310' based on the change 520. At step 840, the auto-focus engine 300 auto-focuses within the next auto-focus window 310'.

The above embodiments are described with relationship to mobile devices implementing augmented reality functionality tracking natural features. In general, these methods and apparatus are equally applicable to other application that uses computer vision related technologies and may benefit from the teachings herein. For example, embodiments above may have the function of tracking natural features replaced or augmented with marker tracking and/or hand tracking. Embodiments may track and focus on a man-made marker (rather than a natural feature) such as a posted QR code (quick response code). Alternatively, embodiments may track and focus on a moving hand (rather than a fixed natural feature or man-made marker), for example, in order to capture gesture commands from a user. These embodiments may provide gesturing interfaces with or without augmented reality functionality.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A mobile device for use in computer vision, the mobile device comprising:
   a natural feature processing engine to track natural features, the natural features being contained by an object or being proximate to the object; and
   an auto-focus engine to track the object and coupled to the natural feature processing engine to communicate between the auto-focus engine and the natural feature processing engine wherein the natural feature processing engine is configured to set a location of a natural feature window based on information received at the natural feature processing engine from the auto-focus engine and the auto-focus engine is configured to set a location of an auto-focus window based on information received at the auto-focus engine from the natural feature processing engine.

2. The mobile device of claim 1, wherein the natural feature window comprises a window having a limited area within an image.

3. The mobile device of claim 2, wherein the information received at the natural feature processing engine from the auto-focus engine indicates the location of the auto-focus window.

4. The mobile device of claim 1, wherein the natural feature window comprises a next tracking search window.

5. The mobile device of claim 4, wherein the information received at the natural feature processing engine from the auto-focus engine indicates a change in location from a previous auto-focus window to a next auto-focus window.

6. The mobile device of claim 4, wherein the information received at the natural feature processing engine from the auto-focus engine comprises a magnitude of the change in the location, and wherein the next tracking search window is set based on the magnitude.

7. The mobile device of claim 4, wherein the information received at the natural feature processing engine from the auto-focus engine comprises a direction of the change in the location, and wherein the next tracking search window is set based on the direction.

8. The mobile device of claim 1, wherein the information received at the auto-focus engine from the natural feature processing engine indicates a change from a previous location of at least one of the natural features to a next location of the at least one of the natural features.

9. A method in a mobile device for use in computer vision, the method comprising:
   tracking an object in an auto-focus engine;
   auto-focusing in an auto-focus window in an image using the auto-focus engine and based on tracking the object;
   tracking natural features with a natural feature processing engine, the natural features being contained by the object or being proximate to the object;
   setting a location of a natural feature window based on information received at the natural feature processing engine from the auto-focus engine; and
   setting a location of an auto-focus window based on information received at the auto-focus engine from the natural feature processing engine.

10. The method of claim 9, wherein the information received at the natural feature processing engine from the auto-focus engine comprises the location of the auto-focus window, and the method further comprises:
    selecting the auto-focus window within the image;
    limiting an area of a natural feature detection based on the location of the auto-focus window; and
    finding a natural feature within the limited area.

11. The method of claim 9, further comprising:
    setting a first auto-focus window within a first image;
    setting a second auto-focus window within a second image, wherein the information received at the natural feature processing engine from the auto-focus engine comprises a change from the first auto-focus window to the second auto-focus window;
    setting a next tracking search window based on the change; and
    tracking at least one of the natural features within the next tracking search window.

12. The method of claim 9, further comprising:
    tracking at least one of the natural features to a first location within a first image;
    tracking the at least one of the natural features to a second location within a second image, wherein the information received at the auto-focus engine from the natural feature processing engine comprises a change from the first location to the second location;
    setting a next auto-focus window based on the change; and
    auto-focusing within the auto-focus window.

13. A mobile device for use in computer vision, the mobile device comprising:
a camera and an auto-focus engine; and
a processor and memory comprising code for:
tracking an object in the auto-focus engine;
auto-focusing in an auto-focus window in an image using the auto-focus engine and based on tracking the object;
tracking natural features with a natural feature processing engine, the natural features being contained by the object or being proximate to the object;
setting a location of a natural feature window based on information received at the natural feature processing engine from the auto-focus engine; and
setting a location of an auto-focus window based on information received at the auto-focus engine from the natural feature processing engine.

14. The mobile device of claim 13, wherein the information received at the natural feature processing engine from the auto-focus engine comprises the location of the auto-focus window, and the mobile device further comprises code for:
selecting the auto-focus window within the image;
limiting an area of a natural feature detection based on the location of the auto-focus window; and
finding one or more of the natural features within the limited area.

15. The mobile device of claim 13, further comprising code for:
setting a first auto-focus window within a first image;
setting a second auto-focus window within a second image, wherein the information received at the natural feature processing engine from the auto-focus engine comprises a change from the first auto-focus window to the second auto-focus window;
setting a next tracking search window based on the change; and
tracking at least one of the natural features within the next tracking search window.

16. A mobile device for use in computer vision, the mobile device comprising:
a camera and an auto-focus engine; and
a processor and memory comprising code for:
tracking an object in the auto-focus engine;
auto-focusing in an auto-focus window in an image using the auto-focus engine;
tracking natural features with a natural feature processing engine, the natural features being contained by the object or being proximate to the object;
setting a location of a natural feature window based on information received at the natural feature processing engine from the auto-focus engine; and
setting a location of an auto-focus window based on information received at the auto-focus engine from the natural feature processing engine.

17. The mobile device of claim 16, wherein the information received at the natural feature processing engine from the auto-focus engine comprises the location of the auto-focus window, and the mobile device further comprising code for:
selecting the auto-focus window within the image;
limiting an area of a natural feature detection based on the location of the auto-focus window; and
finding one or more of the natural features within the limited area.

18. The mobile device of claim 16, further comprising code for:
setting a first auto-focus window within a first image;
setting a second auto-focus window within a second image, wherein the information received at the natural feature processing engine from the auto-focus engine comprises a change from the first auto-focus window to the second auto-focus window;
setting a next tracking search window based on the change; and
tracking at least one of the natural features within the next tracking search window.

19. The mobile device of claim 16, further comprising code for:
tracking at least one of the natural features to a first location within a first image;
tracking the at least one of the natural features to a second location within a second image, wherein the information received at the auto-focus engine from the natural feature processing engine comprises a change from the first location to the second location;
setting a next auto-focus window based on the change; and
auto-focusing within the auto-focus window.

20. A mobile device for use in computer vision, the mobile device comprising:
means for tracking an object in an auto-focus engine;
means for auto-focusing in an auto-focus window in an image using the auto-focus engine and based on tracking the object;
means for tracking natural features with a natural feature processing engine, the natural features being contained by the object or being proximate to the object;
means for setting a location of a natural feature window based on information received at the natural feature processing engine from the auto-focus engine; and
means for setting a location of an auto-focus window based on information received at the auto-focus engine from the natural feature processing engine.

21. The mobile device of claim 20, wherein the information received at the natural feature processing engine from the auto-focus engine comprises the location of the auto-focus window, and the mobile device further comprises:
means for selecting the auto-focus window within the image;
means for limiting an area of a natural feature detection based on the location of the auto-focus window; and
means for finding one or more of the natural features within the limited area.

22. The mobile device of claim 20, further comprising:
means for setting a first auto-focus window within a first image;
means for setting a second auto-focus window within a second image, wherein the information received at the natural feature processing engine from the auto-focus engine comprises a change from the first auto-focus window to the second auto-focus window;
means for setting a next tracking search window based on the change; and
means for tracking at least one of the natural features within the next tracking search window.

23. The mobile device of claim 20, further comprising:
means for tracking at least one of the natural features to a first location within a first image;
means for tracking the at least one of the natural features to a second location within a second image, wherein the information received at the auto-focus engine from the natural feature processing engine comprises a change from the first location to the second location;

means for setting a next auto-focus window based on the change; and means for auto-focusing within the next auto-focus window.

24. A non-transitory computer-readable storage medium including program code stored thereon, comprising program code for:

tracking an object in an auto-focus engine;

auto-focusing in an auto-focus window in an image using the auto-focus engine and based on tracking the object;

tracking natural features with a natural feature processing engine, the natural features being contained by the object or being proximate to the object;

setting a location of a natural feature window based on information received at the natural feature processing engine from the auto-focus engine; and setting a location of an auto-focus window based on information received at the auto-focus engine from the natural feature processing engine.

25. The non-transitory computer-readable storage medium of claim 24, wherein the information received at the natural feature processing engine from the auto-focus engine comprises the location of the auto-focus window, further comprising program code for:

selecting the auto-focus window within the image;

limiting an area of a natural feature detection based on the location of the auto-focus window; and finding one or more of the natural features within the limited area.

26. The non-transitory computer-readable storage medium of claim 24, further comprising program code for:

setting a first auto-focus window within a first image;

setting a second auto-focus window within a second image, wherein the information received at the natural feature processing engine from the auto-focus engine comprises a change from the first auto-focus window to the second auto-focus window;

setting a next tracking search window based on the change; and tracking at least one of the natural features within the next tracking search window.

27. The non-transitory computer-readable storage medium of claim 24, further comprising program code for:

tracking at least one of the natural features to a first location within a first image;

tracking the at least one of the natural features to a second location within a second image, wherein the information received at the auto-focus engine from the natural feature processing engine comprises a change from the first location to the second location;

setting a next auto-focus window based on the change; and auto-focusing within the auto-focus window.

28. The mobile device of claim 1 wherein an area defined by the natural feature window includes a substantially smaller number of pixels than an area defined by the auto-focus window.

* * * * *